Patented Nov. 9, 1943

2,333,661

UNITED STATES PATENT OFFICE 2,333,661

PRODUCTION AND USE OF HYDROUS TITANIUM OXIDE

Andrew T. McCord, Collingswood, and Harold F. Saunders, Haddonfield, N. J., assignors to The Sherwin-Williams Company, Cleveland, Ohio, a company of Ohio No Drawing. Application February 1, 1941, Serial No. 377,046

17 Claims. (Cl. 106—300)

This invention relates to the preparation of titanium pigments, and particularly to the preparation of nuclear solutions and seed crystals and their use in the precipitation of titanium compounds by hydrolysis at elevated temperatures of sulphuric acid solutions containing titanium.

Titanium dioxide pigments are most commonly precipitated from titanium sulphate solutions which have been prepared from the reaction product of a titanium-bearing material such as ilmenite ore and sulphuric acid. The preparation of such solutions is well known in the art and has been described by Blumenfeld in U. S. Patent No. 1,504,669 and by others.

The solution obtained by leaching the digestion mass with water is first treated with sufficient metallic iron to reduce all of the iron present to the ferrous state and then chilled to crystallize out the major portion of the iron present as the sulphate. The solution at this stage may contain around 9% to 13% of $TiO_2$, and is then customarily submitted to a vacuum concentration process to bring the $TiO_2$ content up to 15% to 16%.

This solution may then be hydrolyzed by boiling, but it is customary to assure the presence of a nuclear material in the solution, prior to any actual precipitation of the $TiO_2$ by boiling, for the purpose of accelerating the rate of hydrolysis, increasing the yield and controlling the physical characteristics of the precipitated particles. This nuclear material may be formed in situ in the solution by dilution under rigidly controlled conditions, or added as a separately prepared seeding material.

In the prior art, titanium dioxide produced from the precipitate resulting from the hydrolysis at elevated temperatures of a crystalloidal solution of titanium in sulphuric acid in the presence of an adequate amount of colloidal $TiO_2$ compound, as seeding material, after suitably washing, treating, and calcining, has been the anatase modification.

In our copending application, Serial No. 356,-646, to which this application is related, we have shown that when a specific type of titanium compound which we have termed γ-titanic acid is added to the sulphuric acid solution of titanium as a nucleating agent, the precipitate obtained by thermal hydrolysis may be calcined to the rutile modification at temperatures between 800–1000° C.

In that application, γ-titanic acid is defined as a form of hydrous titanium oxide characterized as producing upon X-ray analysis a band diffraction pattern, the bands not corresponding in position to either the characteristic position of rutile or anatase lines. The characteristic positions of the bands and lines are shown in the following table:

| Bands of γ-titanic acid | Lines of anatase | Lines of rutile |
|---|---|---|
| Å. U. | Å. U. | Å. U. |
| 5.83 | 3.49 | 3.24 |
| 3.99 | 2.37 | 2.48 |
| 3.145 | 1.883 | 2.29 |
| 2.600 | 1.695 | 2.18 |
| 2.132 | 1.655 | 2.04 |
| 1.888 | 1.477 | 1.685 |
| 1.499 | 1.358 | 1.617 |
| 1.354 | 1.334 | 1.479 |
| 1.177 | 1.261 | 1.448 |
| .956 | 1.161 | 1.351 |
| .868 | 1.044 | 1.240 |
| .743 | 1.015 | 1.167 |
|  | .951 | 1.144 |
|  | .913 | 1.092 |
|  | .892 |  |
|  | .876 |  |
|  | .843 |  |
|  | .824 |  |
|  | .806 |  |

In the copending application Serial No. 370,486, filed Dec. 17, 1940 (Patent 2,326,157, issued Aug. 10, 1943), to which this application also relates, a table is set forth extending the characteristic lines of γ-titanic acid and including the relative densities of these lines.

It will then be understood that in this specification and in the claims of this application the term "γ-titanic" acid is used to denote a compound of titanium so defined.

Application Serial Nos. 356,646 and 370,486 further describe several methods by which γ-titanic acid may be prepared.

We have now found that the hydrous titanium compound termed γ-titanic acid may be converted to a specific compound which produces upon X-ray examination a band diffraction pattern characteristic of anatase, but differing from the hydrous titanium compound obtained by thermal hydrolysis of sulphuric acid solutions of ilmenite and which also produces upon X-ray a band diffraction pattern of anatase by its ability to calcine to the rutile modification at a temperature between 800–1000° C., while the latter at calcination temperatures up to 1000° C. produces only anatase. We have further found that when our specific hydrous oxide of the anatase crystal structure is added to ilmenite solution as a nucleating agent prior to hydrolysis, all of the precipitate obtained by hydrolysis will be of a type corresponding to the seeding material in that it, too, while showing the band pattern of anatase upon X-ray examination, may be calcined to rutile at temperatures between 800–1000° C. We have further found that when a sulphuric acid solution of titanium nucleated with the anatase derived from γ-titanic acid is hydrolyzed in the presence of anhydrite or other extender pigment, the precipitate, upon suitably washing, treating, and calcining will be a titanium extended pigment in which the titanium content is present as the rutile modification.

We are aware that a specific hydrous form of titanium compound which would show upon X-ray examination a band pattern characteristic of anatase and which would calcine to rutile at a temperature of 1000° C. was reported by Weiser and Milligan and described in their article "X-ray studies on the hydrous oxides IV" in the J. Phys. Chem. 38, 513 (1934) by contacting a hydrochloric acid solution of titanium tetrachloride with aqua ammonia and boiling the amorphous precipitate obtained, but it was not known or disclosed that such a compound could be used as a nucleating agent for ilmenite solution to produce a product readily convertible into rutile.

We have now discovered that when anatase derived from γ-titanic acid is used as nucleating or seeding material in the hydrolysis of sulphuric acid solutions containing titanium, the $TiO_2$ precipitate will upon calcination be converted into rutile form at the usual calcination temperatures of between 800° C. and 1000° C.

By means of our invention we are able to obtain:

(a) Conversion of γ-titanic acid of any origin to a hydrous titanium compound which will give the X-ray diffraction pattern of anatase and which may be calcined to rutile between 800–1000° C. by dispersing said γ-titanic acid of any origin in sulphuric acid and thermally hydrolyzing the dispersion.

(b) Conversion of γ-titanic acid to a titanium compound which shows the band diffraction pattern of anatase and which may be calcined to rutile between 800–1000° C. by boiling, or by drying at low temperatures.

(c) A precipitated hydrous oxide showing a band diffraction pattern characteristic of anatase and which may be calcined to rutile at a temperature between 800–1000° C. by hydrolyzing an ilmenite solution containing as a nucleating agent a specific titanium compound showing an X-ray diffraction band pattern of anatase, which is derived from γ-titanic acid and which may in itself be calcined to rutile at temperatures between 800–1000° C.

(d) A precipitate which may be calcined to titanium extended pigment wherein the titanium content is in the rutile modification and obtained by the use of a γ-titanic acid or a titanium compound derived from γ-titanic acid, which shows an X-ray diffraction pattern of anatase, and which may in itself be calcined to rutile at a temperature between 800–1000° C. for nucleating an ilmenite solution, and the hydrolysis of such nucleated ilmenite solution in the presence of anhydrite or other extenders.

(e) A pure titanium dioxide by performing the steps above referred to under (d) and wherein the extender pigment is a minor amount of calcium sulphate, and from which the calcium sulphate is removed by washing prior to calcination.

An important part of our process is the separation of the precipitate obtained by contacting a mineral acid solution of titanium with ammonia or other alkali from the soluble products of reaction or from excess residual acids in order that the γ-titanic acid structure may develop. Numerous patents have been issued wherein the pH of an ilmenite solution was lowered by addition of an alkali, thereby forming in situ a colloidal titanium compound with seeding properties. This solution without removal of excess sulphuric acid, when added to a further quantity of ilmenite solution, effected acceleration of hydrolysis and improvement in yield upon boiling, but the precipitate after suitably washing, treating, and calcining, gave only anatase. Without wishing to be bound in any way by our theories, we believe this condition results because the specific type of crystallinity characterized as γ-titanic acid had not been allowed to develop and does not satisfactorily develop in the presence of certain electrolytes. We have found that complete separation from such reaction products and residual acids is not necessary, but at least a major portion must be removed, otherwise the rutile-forming properties are not adequately obtained.

*Conversion of γ-titanic acid to anatase by boiling and by low temperature heating*

*Example 1.*—A solution of ammonium fluotitanate in water at room temperature containing 10% $TiO_2$ was run into an excess of 20% aqua ammonia with agitation. The ratio of 20% aqua ammonia to $TiO_2$ was 35:1. The precipitate obtained was thoroughly washed and boiled in an aqueous suspension with three times its weight of water for 1 hour. X-ray examination then showed a band pattern characteristic of γ-titanic acid. (1a) Boiling of the slurry was continued for a further period of five hours, and X-ray examination then gave the pattern of anatase. (1b) A portion of the sample taken after the 1 hour boiling and showing the γ-titanic acid structure was dried and heated for 6 hours at 184° C. Examination then showed the pattern of anatase. A temperature as high as 800° C. may be employed for a shorter time with equivalent results of producing anatase. The γ-titanic acid obtained from precipitation of fluoride solution of titanium is, therefore, more resistant to boiling than the precipitate from hydrochloric solution, but the change eventually does occur upon boiling. The anatases 1a and 1b were then separated from excess water, treated with $MgSO_4$ (calculated as 0.2% MgO by weight to the weight of $TiO_2$ present), as claimed in companion application Serial No. 367,390, filed Nov. 27, 1940 (Patent 2,326,182, issued Aug. 10, 1943), dried and calcined for four hours at 900° C. The product in both cases was pigmentary rutile, of high tinting strength, whiteness and brightness, and of smooth texture.

*Example 2.*—A sample of hydrous titanium oxide from thermal hydrolysis of ilmenite solution, showing an anatase band pattern, was dispersed in an equal weight of 96% sulphuric acid, diluted to twice its volume with water, and sufficient metallic zinc added to convert the titanium to the titanous form. One volume of the reduced dispersion was slowly poured into four volumes of 20% aqua ammonia and the heavy dark blue precipitate obtained was then oxidized by adding sufficient hydrogen peroxide to destroy the blue color. The precipitate was then a slightly yellowish white. The precipitate was filtered and washed until no odor of ammonia could be detected in the filtrate. X-ray examination of the hydrate thus obtained showed the band pattern characteristic of γ-titanic acid. This hydrate behaved similarly to the fluoride hydrate in that boiling in 10% aqueous suspension for one hour showed the γ-titanic acid pattern, but prolonging the boil for a further five hours showed conversion to anatase upon X-ray examination. The hydrate was then separated from the excess water, dried, and calcined for two hours at 975° C. The product was pigmentary rutile.

Example 3.—In a manner analogous to Example No. 1, an iron-free nitric acid solution of titanium and a sulphuric acid solution of titanium containing 10% $TiO_2$ were precipitated with ammonia, washed, and given a boil in aqueous suspension for six hours. The hydrates obtained showed in both cases an anatase band pattern and were converted to rutile by calcination for 2 hours at 975° C.

Conversion of γ-titanic acid to anatase by thermal hydrolysis from a sulphuric acid dispersion Example 4.—γ-titanic acid was prepared by contacting a solution of ammonium fluotitanate with aqua ammonia, thoroughly washing the precipitate and boiling in water for one hour as in Example 1. The cake was dewatered to 20% $TiO_2$ and then air-dried to 75% $TiO_2$. 100 grams of this cake, equivalent to 75 grams $TiO_2$ was heated to 70° C. with 90 grams $H_2SO_4$ and 275 grams of water. The mixture was filtered and heated to a boil for 1 hour. The titanium was completely precipitated, and upon separating and washing until the filtrate was substantially free from $H_2SO_4$, and dewatering, showed upon X-ray examination a distinct band diffraction pattern of anatase. This hydrous oxide upon calcination for one hour at 950° C. gave a $TiO_2$ which showed a pattern, the lines of which were substantially only those of rutile.

Example 5.—It was found upon experiment that the γ-titanic acids obtained by precipitation of other fluoride solutions of titanium, nitric acid solutions of titanium, hydrochloric acid solutions of titanium, and sulphuric acid solutions of titanium with ammonia, an alkali metal oxide, hydroxide, or carbonate, or group II oxides, hydroxides, or carbonates were also converted to anatase by dispersion in sulphuric acid and subsequent hydrolysis and treating in the same manner as described in Example 4, and were further convertible to rutile by calcination at temperatures between 850 and 950° C. for short periods of one to two hours.

The preparation of a hydrous oxide of anatase structure which may be converted to rutile at temperatures below 1000° C. by thermal hydrolysis in the presence of sulphate ions is believed to be entirely novel and is unexpected in view of the commercial practice of thermally hydrolyzing sulphate solutions of titanium, in which case the anatase precipitate obtained retains the anatase crystalline structure, although calcined for many hours at 1000° C. Without being in any way bound by our theory, we explain this unexpected result as due to the inherent ability of the γ-titanic acid, once formed, to retain its characteristics even though redispersed in and thermally hydrolyzed from sulphuric acid.

Nucleation of ilmenite solutions with anatase derived from γ-titanic acid

Example 6.—A quantity of moist anatase cake prepared from γ-titanic acid by boiling in aqueous suspension as in Example 1a and containing 38% $TiO_2$ was heated with an equal weight of 93% sulphuric acid until a clear, viscous mass was obtained. Sufficient water was added (about 25% of its weight) to somewhat reduce the consistency. A quantity of this diluted dispersion equivalent to 1.4 grams of $TiO_2$ was added to one kilo of ilmenite solution containing 13.2% $TiO_2$ and 23.0% $H_2SO_4$, and the mixture was boiled for five hours. The yield of $TiO_2$ precipitated was slightly over 95%. The precipitate was separated and washed until free from iron. The wet cake containing 33% $TiO_2$ was mixed with 1% HF (based on $TiO_2$) and calcined for two hours at 975° C. The product was of good pigmentary properties and X-ray examination showed the diffraction pattern of rutile.

Example 7.—A quantity of the anatase cake prepared as in Example 1b (except that the time of drying the γ-titanic acid was 700° C. for 1 hour) was dispersed in 2.5 times its weight of 93% sulphuric and otherwise carried through the procedure as in Example 6. A rutile of similar characteristics was obtained.

Example 8.—A quantity of the moist cake obtained by dispersion of γ-titanic acid in sulphuric acid followed by hydrolysis and washing of the precipitate as in Example 4 and containing 35% $TiO_2$ was redispersed in an equal weight of 93% sulphuric acid. This dispersion was used in the same manner as described under Example 6 for the nucleation of ilmenite solution, followed by hydrolysis, washing, treating, dewatering, and calcination to produce a rutile pigment.

Any of the anatase products described in the previous section, and of γ-titanic origin, may be used in preparing rutile pigment, by procedures as Examples 6 to 8.

The wet cake produced in Examples 6, 7 and 8 may be used for nucleating an ilmenite solution to produce more of the same cake.

Nucleation of ilmenite solutions with anatase derived from γ-titanic acid and hydrolysis in the presence of an extender pigment The following single example is given as illustrating this type of process. It will be understood that any of the anatases derived from γ-titanic acid of any origin may be employed as substitutes for that shown. Anhydrite ($CaSO_4$) is given in the example as typifying any of the customary extenders which are used in the industry, as, for instance, barium sulphate, magnesium silicate, silica, etc.

Example 9.—γ-titanic acid was prepared from ammonium fluotitanate solution containing 10% $TiO_2$, as described in Example 1. The washed precipitate, reslurried and boiled for 1 hour, was air dried and then heated for ten minutes at 800° C. The titanium oxide at this point showed a band pattern of anatase. 100 grams of this anatase was heated with 270 grams of 93% sulphuric acid until a clear, viscous mass resulted. This was diluted with 25% of water to produce a somewhat thinner consistency. A quantity of this liquid containing 1 gram of $TiO_2$ was added to an ilmenite solution containing 100 grams of $TiO_2$ and analyzing 8.3% $TiO_2$ and 19% $H_2SO_4$. This seeded solution was added to a slurry of calcium sulphate in anhydrite form obtained by suspending 240 grams of dry anhydrite in 800 grams of water. The mixture was boiled for 3 hours. The precipitate was separated and washed with 10 liters of water. The ratio of $CaSO_4$ to $TiO_2$ was then 70:30. The slurry was dewatered and mixed with 0.2% $MgSO_4$ (calculated as MgO on weight of $TiO_2$) and calcined for 2 hours at 975° C. The product was extremely white, excellent soft texture, possessed a tinting strength of 650, and X-ray examination of the titanium content (obtained by washing out the $CaSO_4$ with $HNO_3$) showed the titanium to be present as rutile.

It is also to be understood that the example above representing 70:30 ratio $CaSO_4$ to $TiO_2$ is only representative, as ratios of $TiO_2$ from 1 up to 100 are within the scope of the practice of this invention.

From the foregoing examples it will appear that the new form of anatase which can be readily converted to rutile may be prepared by:

(a) Dispersing γ-titanic acid in sulphuric acid and reprecipitating by heating,
(b) Boiling γ-titanic acid in water, and
(c) Drying γ-titanic acid and heating.

So far as we have been able to determine, the anatase prepared by all three such procedures was the same and they are identical for the purpose of nucleating or seeding an ilmenite solution to produce a hydrous titanium oxide having an anatase structure and which may be readily calcined to produce rutile.

The following tabulation demonstrates the superiorities of our pigment:

*Tinting strength determined by the ASTM Procedure D-332-36*

| | |
|---|---|
| 70:30 $CaSO_4$ γ-anatase pigment by prior art (high grade commercially available pigments) | 450–470 |
| 70:30 pigments prepared as in Example 9 | 650 |
| 70:30 pigments prepared as in Example 10 | 640 |
| 70:30 pigments prepared as in Example 11 | 635 |
| 70:30 pigments prepared as in Example 12 | 600 |

*Hiding power*

Hiding power as square feet per pound of pigment, was determined according to ASTM Designation D-406-39, on the prior art pigments, and shows 48 sq. ft., while our 70:30 extended $TiO_2$ products showed from 55 to 65 sq. ft.

*Color*

A direct visual comparison in oil shows our product to be equal or superior to the highest grades 70:30 $CaSO_4$ anatase extended pigments available and to possess a superior retention of color on exposure to atmospheric condition in paint film.

Because of the greater hiding power, further extension of rutile pigments in paint formulation is possible with our pigments, to obtain hiding power equal to prior art pigments. Besides economy, another advantage of this lies in ability to obtain considerably further flatting effects in flat paint formulation, since flatting is in considerable measure increased with increasing proportion of inert pigments.

It would not appear necessary to present detail paint formulations, illustrating usage of our pigment, since formulation with $CaSO_4$:$TiO_2$ extended pigments is common knowledge. Our products may be substituted pound for pound for prior art pigment with the improved results in hiding, color, brightness, etc., previously noted.

*Example 10.*—γ-titanic acid was prepared by dissolving titanium tetrachloride in twice its volume of water and slowly adding this mixture to four times its volume of 20% aqua ammonia. The precipitate was washed until the filtrate was substantially free from ammonia. A small sample at this point was air dried at 60° C. and an X-ray diffraction pattern was typical of γ-titanic acid. The wet hydrate was slurried in water to contain approximately 5% $TiO_2$ and boiled for six hours. The slurry was dewatered. A small portion was air dried at 60° C. and showed the typical anatase X-ray diffraction band pattern. The wet cake, containing 30% $TiO_2$, was redispersed in an equal weight of sulphuric acid. An amount of this dispersion equivalent to one gram of $TiO_2$ was added to 1,250 grams of ilmenite solution containing 8.1% $TiO_2$ and 19% $H_2SO_4$. This nucleated ilmenite solution was added to a slurry of anhydrite in water containing 235 grams $CaSO_4$, 180 grams $H_2SO_4$, and 820 grams of water. The mixture was boiled four hours to complete the thermal hydrolysis of the titanium. The solids were separated and washed until the filtrate was iron-free, dewatered and calcined 2 hours at 975° C. The product was a titanium extended pigment containing approximately 70% $CaSO_4$ and 30% $TiO_2$, and in which the titanium content was present substantially as rutile.

Certain of the subject matter disclosed in this application as filed has been divided out and is claimed in our copending applications Serial Nos. 441,532 and 441,533, filed May 2, 1942.

Having thus described our invention, what we claim as new and desire to secure by Letters Patent is:

1. The process of forming anatase which includes boiling a sulphuric acid dispersion of γ-titanic acid.

2. The process of forming a hydrous titanium oxide having the anatase structure which includes dispersing of γ-titanic acid in sulphuric acid and reprecipitating by heating to a temperature from about 90° C. to about the boiling temperature of the dispersion.

3. The process of forming a hydrous titanium oxide having the anatase structure which includes precipitating ammonium fluotitanate with aqua ammonia, separating the precipitate as γ-titanic acid, and heating said precipitate in a sulphuric acid dispersion.

4. The process of forming a hydrous titanium oxide having the anatase structure which includes precipitating ammonium fluotitanate with aqua ammonia, separating the precipitate as γ-titanic acid, drying the precipitate and heating in a sulphuric acid solution.

5. The process of forming a hydrous titanium oxide having the anatase structure which includes precipitating ammonium fluotitanate with aqua ammonia, separating the precipitate as γ-titanic acid, dispersing the precipitate in sulphuric acid and reprecipitating by heating to a temperature between about 90° C. and the boiling point.

6. The process of producing a hydrous titanium oxide having the anatase structure and which may be calcined to rutile, which process includes seeding an ilmenite solution with a small amount of the hydrous titanium oxide prepared by the process defined in claim 2 and hydrolyzing said solution.

7. The process of producing a hydrous titanium oxide having the anatase structure and which may be calcined to rutile, which process includes seeding an ilmenite solution with a small amount of anatase identical with that obtained by heating γ-titanic acid in sulphuric acid.

8. The process of making rutile which includes heating γ-titanic acid in a sulphuric acid dispersion until a hydrous titanium oxide having an anatase structure has developed and calcining said hydrous titanium oxide at a temperature between 800° C. and about 1000° C.

9. The process of producing rutile which includes seeding an ilmenite solution with a small amount of anatase identical with that obtained by boiling a sulphuric acid dispersion of γ-titanic acid, hydrolyzing said solution, separating the precipitate and calcining it at a temperature between about 800° C. and about 1000° C.

10. The process of making an extended pigment which includes nucleating an ilmenite solution with anatase identical with that resulting from boiling a sulphuric acid dispersion of γ-titanic acid and hydrolyzing said solution in the presence of calcium sulphate.

11. The process of making a pigmentary rutile which includes nucleating an ilmenite solution with anatase identical with that derived from γ-titanic acid by heating a dispersion thereof in sulphuric acid, hydrolyzing said solution in the presence of calcium sulphate, washing out the calcium sulphate from the precipitate, and calcining.

12. The process of making an extended pigment which includes nucleating an ilmenite solution with anatase identical with that prepared by heating a sulphuric acid dispersion of γ-titanic acid obtained from precipitation of ammonium fluotitanate with ammonia, hydrolyzing said solution in the presence of an extender, separating, washing and calcining the precipitate.

13. The process which includes heating a sulphuric acid dispersion of γ-titanic acid at between 90° C. and boiling to produce a hydrous titanium oxide having anatase structure, separating the precipitate, redispersing said hydrous titanium oxide in sulphuric acid, adding said dispersed hydrous titanium oxide to an ilmenite solution as a nucleating agent, hydrolyzing said solution to form a precipitate, separating the precipitate, washing and calcining it.

14. The process which includes heating a sulphuric acid dispersion of γ-titanic acid to produce a hydrous titanium oxide having anatase structure, redispersing said hydrous titanium oxide in sulphuric acid, adding said dispersed hydrous titanium oxide to an ilmenite solution as a nucleating agent, hydrolyzing said solution to form a precipitate in the presence of an extender, separating the precipitate, washing and calcining it.

15. The process of forming a hydrous titanium oxide having the anatase structure which includes precipitating a titanium solution by the action of ammonia in the presence of a compound selected from the group consisting of the oxides, hydroxides and carbonates of alkali metals and metals of group II, dispersing the precipitate in sulphuric acid, and reprecipitating by heating.

16. The process of producing rutile which includes boiling a sulphuric acid dispersion of γ-titanic acid to form a hydrous titanium oxide having an anatase structure, seeding an ilmenite solution with a small amount of said hydrous titanium oxide, hydrolyzing said solution, separating the precipitate, and calcining it at a temperature between 800° C. and about 1000° C.

17. The process of making an extended pigment which includes nucleating an ilmenite solution with anatase identical with that prepared by heating a sulphuric acid dispersion of γ-titanic acid, hydrolyzing said solution in the presence of an extender, separating, washing and calcining the precipitate.

ANDREW T. McCORD.
HAROLD F. SAUNDERS.